(12) United States Patent
Van Eeden

(10) Patent No.: US 10,687,516 B1
(45) Date of Patent: Jun. 23, 2020

(54) METHODS AND SYSTEMS FOR FACILITATING THE MANAGEMENT OF DATA ASSOCIATED WITH A PET

(71) Applicant: Jacobus Sarel Van Eeden, Dallas, TX (US)

(72) Inventor: Jacobus Sarel Van Eeden, Dallas, TX (US)

( * ) Notice: Subject to any disclaimer, the term of this patent is extended or adjusted under 35 U.S.C. 154(b) by 0 days.

(21) Appl. No.: 16/566,166

(22) Filed: Sep. 10, 2019

(51) Int. Cl.
*A01K 29/00* (2006.01)
*A01K 11/00* (2006.01)
*G06N 20/00* (2019.01)

(52) U.S. Cl.
CPC ......... *A01K 29/005* (2013.01); *A01K 11/006* (2013.01); *G06N 20/00* (2019.01)

(58) Field of Classification Search
CPC ..... A01K 29/005; A01K 11/006; G06N 20/00
USPC ...................................... 340/573.1
See application file for complete search history.

(56) References Cited

U.S. PATENT DOCUMENTS

| | | | |
|---|---|---|---|
| 9,807,982 B2 | 11/2017 | Hall | |
| 2014/0331942 A1* | 11/2014 | Sarazyn | A01K 29/005 119/719 |
| 2016/0156720 A1* | 6/2016 | Bransfield, Jr. | G01S 19/14 709/227 |
| 2016/0242393 A1* | 8/2016 | Kennedy | A01K 27/001 |
| 2016/0302393 A1* | 10/2016 | Pradeep | A01K 27/001 |
| 2017/0295825 A1 | 10/2017 | Peron et al. | |
| 2017/0372631 A1* | 12/2017 | Meggs | A01K 11/006 |
| 2018/0064068 A1* | 3/2018 | McKee | A01K 27/009 |
| 2019/0029221 A1 | 1/2019 | Anderton et al. | |

* cited by examiner

*Primary Examiner* — Kerri L McNally
(74) *Attorney, Agent, or Firm* — Patent Yogi LLC; Dhiraj Jindal

(57) ABSTRACT

Disclosed herein is a method of facilitating the management of data associated with a pet, in accordance with some embodiments. Accordingly, the method may include a step of receiving, using a communication device, at least one data from at least one IoT device associated with a pet. Further, the method may include a step of generating, using a processing device, a pet profile corresponding to the pet based on the at least one data associated with the pet. Further, the method may include a step of analyzing, using the processing device, the pet profile based on machine learning. Further, the method may include a step of generating, using the processing device, at least one instruction based on the analyzing. Further, the method may include a step of transmitting, using the communication device, the at least one instruction to at least one device.

16 Claims, 6 Drawing Sheets

METHODS AND SYSTEMS FOR FACILITATING THE MANAGEMENT OF DATA ASSOCIATED WITH A PET

TECHNICAL FIELD

Generally, the present disclosure relates to the field of data processing. More specifically, the present disclosure relates to methods and systems for facilitating the management of data associated with a pet.

BACKGROUND

The field of data processing is technologically important to several industries, business organizations and/or individuals. In particular, the use of data processing is prevalent for facilitating the management of data associated with a pet.

Pets may provide companionship and friendship to pet owners. Further, the pet owners in return may take care of the pets. Further, each pet has unique care needs. Further, pet-owners and pet-care providers have to take all the unique aspects and characteristics of the pets into consideration for daily pet care. Further, real-time, insightful, evolving knowledge and information, based on the uniqueness of the pet and the personal needs of the pet may not be available at the fingertips of the pet-owner, pet service providers, family members or friends to take better and contiguously improved care of the pets. Further, the pet owners may have to look for different gestures and habits of the pets to determine whether the pets may need something or the pets may be suffering from a health condition. Further, the pet owner may also find difficulties in determining the specific needs of the pets on an ongoing basis. Further, the pet owner may struggle to find the right caregivers, health options, foods, treats, litter, products, etc. that may suit the specific needs of the pets. Further, the pet owner may face problems to keep track of personal care and/or products that worked or did not work in the past. Further, the pet owner may not be aware of the new options or suggestions regarding personal care and/or products that nay meet the personal needs of the pets.

Existing techniques for the management of data associated with a pet are deficient with regard to several aspects. For instance, current technologies do not provide a way to receive observation regarding the pet in real-time. Furthermore, current technologies do not provide a way to generate evolving profile information of the pets. Moreover, current technologies do not provide a smart intuitive knowledge based system that proactively predicts the needs of the pets and the pet owner.

Therefore, there is a need for improved methods and systems to facilitate the management of data associated with a pet that may overcome one or more of the above-mentioned problems and/or limitations.

BRIEF SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of facilitating the management of data associated with a pet, in accordance with some embodiments. Accordingly, the method may include a step of receiving, using a communication device, at least one data from at least one Internet of Things (IoT) device associated with a pet. Further, the method may include a step of generating, using a processing device, a pet profile corresponding to the pet based on the at least one data associated with the pet. Further, the method may include a step of analyzing, using the processing device, the pet profile based on machine learning and artificial intelligence. Further, the method may include a step of generating, using the processing device, at least one instruction based on the analyzing. Further, the method may include a step of transmitting, using the communication device, the at least one instruction to at least one device.

Further disclosed herein is a system for facilitating the management of data associated with a pet, in accordance with some embodiments. Accordingly, the system may include at least one device configured for generating at least one data associated with a pet. Further, the system may include a communication device configured for receiving the at least one data from the at least one IoT device. Further, the communication device may be configured for transmitting at least one instruction to at least one device. Further, the system may include a processing device configured for generating a pet profile corresponding to the pet, based on the at least one data associated with the pet. Further, the processing device may be configured for analyzing the pet profile based on machine learning and artificial intelligence. Further, the processing device may be configured for generating the at least one instruction based on the analyzing.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicant(s). In addition, the drawings may contain other marks owned by third parties and are being used for illustrative purposes only. All rights to various trademarks and copyrights represented herein, except those belonging to their respective owners, are vested in and the property of the applicant. The applicant(s) retains and reserve all rights in his/their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION

Figure 1:
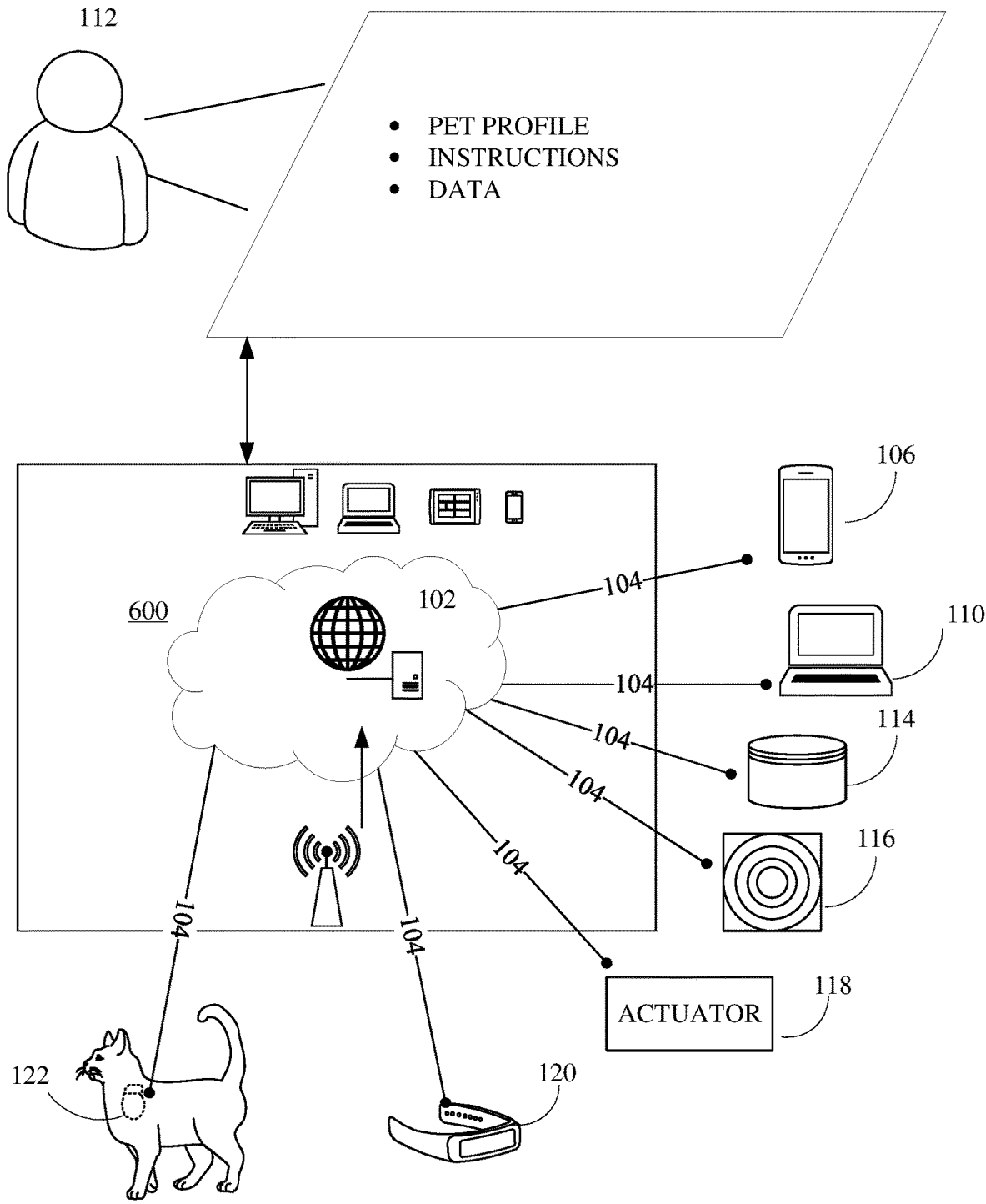
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of facilitating the management of data associated with the pet., embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer etc.) and/or possession of a machine-readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the one or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between the performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

Pets may have personal unique pet-attributes and characteristic such as pet home-base location, pet type, pet age, pet weight, pet size, pet eating habits (including type of food/ treats they eat, or cannot eat, how they eat, where they eat, when they eat), pet diet needs, pet drinking habits, pet exercise routines, pet playing habits, pet grooming needs, pet sleeping patterns, pet behavior (at home, during traveling or at pet care providers), pet health condition, pet physical characteristics (eye-sight, body impediments, hearing etc.), pet bathroom habit, pet litter habits and pet handling rules. Further, the unique pet information or attributes may be captured in a system. Further, the system may include a central smart database with an application that seamlessly connects with APIs to IoT devices, other connected pet products, cameras, sensors, and works on the web and mobile devices connected and integrated to the home, pets, and devices. Further, the database and application may have a data-driven personal pet-bot with learning data algorithms using Artificial intelligence and machine learning. Further, the machine learning may enable continuous learning, automation, and insights in a smart intuitive way. Further, the machine learning may generate proactive suggestions, assistance, triggers, actions and alerts for personalized products, care and interactions as needed for the pet, the pet-owner and pet-care provider. Further, the system may enable pet-food, pet-product, and pet-service to be linked to the pet individually or a whole pet-family with the ability to set up a subscription or automated buying. Further, a smart and secure customizable pet-profile may also be shared with pet-care providers on social media and mobile channels. The smart and secure customizable pet profile may educate pet owner regarding the care needed by the pets. Further, the pet-care providers may add video, text, voice or photos in real-time while the pet care provider may be caring for the pet. Thus, enabling the pet-owner to stay connected with the pets in real-time.

FIG. 1 is an illustration of an online platform 100 consistent with various embodiments of the present disclosure. By way of non-limiting example, the online platform 100 to facilitate the management of data associated with the pet, may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), wearable devices 120, implanted devices 122, databases 114, sensors 116 and actuators 118 over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web-based software application or browser. The web-based software application may be embodied as, for example, but not be limited to, a website, a web application, a desktop application, and a mobile application compatible with a computing device 600.

Figure 2:
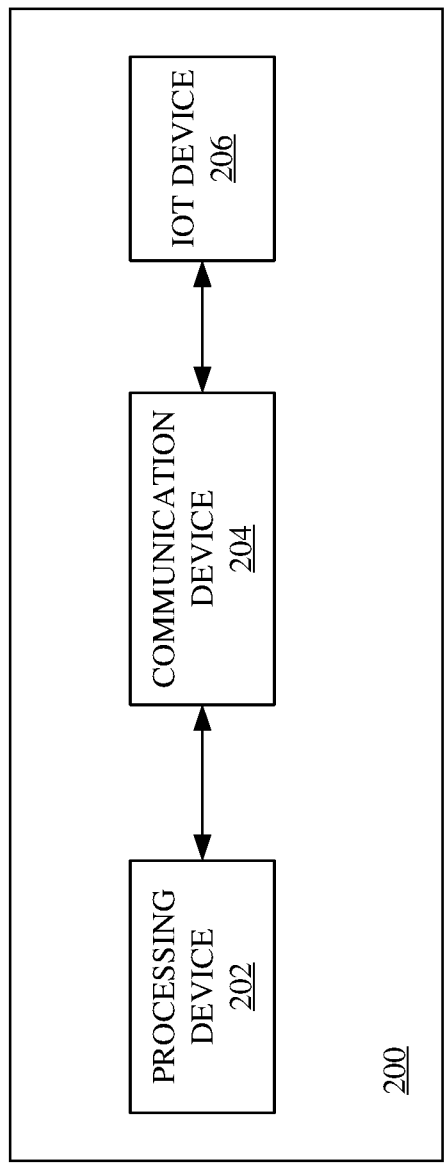
FIG. 2 is a block diagram of a system for facilitating the management of data associated with the pet, in accordance with some embodiments.

FIG. 2 is a block diagram of a system for facilitating the management of data associated with the pet, in accordance with some embodiments. Further, the system, may include at least one IoT device 206, a communication device 204, and a processing device 202.

Further, the at least one IoT device 206 may be configured for generating at least one data associated with a pet. Further, the IoT device 206 may be configured for generating at least one data. Further, the IoT device 206 may include at least one sensor.

Further, in some embodiments, the system 200 may include the at least one IoT device 206. Further, the at least one IoT device 206 may include at least one sensor. Further, the at least one sensor may be associated with the pet. Further, the at least one sensor, in an instance, may include an image sensor, a sound sensor, a temperature sensor, a humidity sensor, a motion sensor, a weight sensor, a blood glucose sensor, a heartbeat sensor, and so on. Further, the at least one data may include any data associated with the pet. Further, the at least one data may include sensor data from the at least one sensor. Further, the at least one sensor data, in an instance, may include temperature data, humidity data, sunlight exposure data, sound exposure, movement data, weight data, blood glucose data, heartbeat data, etc.

Further, the communication device 204 may be configured for receiving the at least one data form the at least one IoT device 206. Further, the communication device 204 may be configured for transmitting at least one instruction to at least one device. Further, the at least one instruction, in an instance, may include a direction, a command, an order, a directive, a demand and/or a requirement to perform at least one operation and/or to describe at least one operation. Further, the at least one instruction may include a direction to actuate at least one mechanism of at least one actuator. Further, the at least one instruction may include at least one notification associated with the pet. Further, the at least one notification may include, suggestion, alert, assistance, action, etc. Further, the at least one notification may be in the form of a message. Further, the message may include text message, audio message, video message, etc. Further, the at least one instruction may include an indication of at least one behavior associated with the pet. Further, the at least one behavior may include, sleeping pattern, eating pattern, playing pattern, toilet pattern, etc. Further, the indication of behavior may include the initiation, duration, and termination of the at least one behavior.

Figure 3:
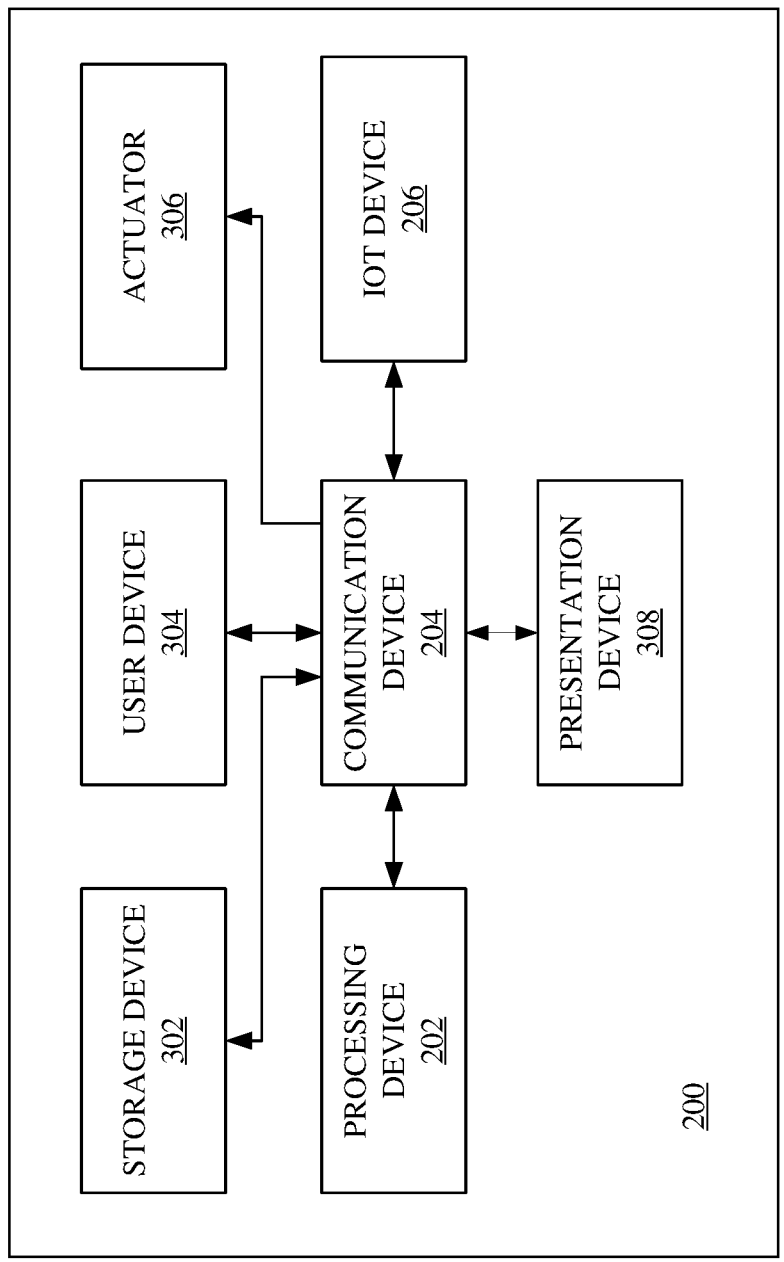
FIG. 3 is a block diagram of a system for facilitating the management of data associated with the pet, in accordance with some embodiments.

Further, in some embodiments, the system 200 may include the communication device 204. Further, the communication device 204 may be configured for receiving the at least one data. Further, the at least one data may include a plurality of data corresponding to a plurality of pets. Further, the processing device 202 may be configured for performing the machine learning based on the plurality of data. Further, the plurality of data may include a plurality of pet profiles associated with the plurality of pets. Further, in some embodiments, the system may include the communication device 204. Further, the communication device 204 may be configured for receiving the at least one data. Further, the at least one data may include historical data and current data. Further, the system 200 further may include a storage device 302 as shown in FIG. 3. Further, the processing device 202 may be configured for performing the machine learning based on the historical data. Further, the processing device 202 may be configured for analyzing the current data. Further, the historical data may include previously recorded pet profile associated with the pet. Further, the current data may include instantaneous pet profile associated with the pet.

Further, in some embodiments, the system 200 may include the communication device 204. Further, the communication device 204 may be configured for transmitting the at least one instruction. Further, the at least one instruction may include at least one notification. Further, the at least one device may include at least one user device 304. Further, the at least one user device may be configured to present the at least one notification. Further, the at least one notification may include, suggestion, alert, assistance, action, etc. Further, the at least one notification may be in the form of a message. Further, the message may include text message, audio message, video message, etc. Further, the at least one user device may include presentation device such as, but not limited to, a smartphone, a smartwatch, a tablet, a personal computer (PC), a desktop, a laptop, and so on. Further, the at least one user may include a pet owner, a pet care provider, a pet service provider, a vetinarian, a pet product provider, etc.

Further, in some embodiments, the system 200 may include the communication device 204. Further, the communication device 204 may be configured for transmitting at least one instruction. Further, the at least one instruction may include an indication of at least one behavior associated with the pet. Further, the at least one behavior may include, sleeping pattern, eating pattern, playing pattern, toilet pattern, etc. Further, the indication of behavior may include the initiation, duration, and termination of the at least one behavior.

Further, in some embodiments, the system 200 may include the communication device 204. Further, the communication device 204 may be further configured for receiving the at least one data from the at least one user device 304, as shown in FIG. 3, associated with at least one user.

Further, in some embodiments, the system 200 may include the communication device 204. Further, the communication device 204 may be configured for transmitting the at least one instruction to the at least one device. Further, the at least one instruction may include a purchase instruction. Further, the at least one device may include an online store server. Further, the purchase instruction may include at least one need of the pet. Further, the at least one need of the pet may include pet products. Further, the purchase instruction may include a request for purchasing the pet product to the online store server. Further, the online store server may register the request and facilitate the delivery of the pet products the at least one user.

Further, the processing device 202 may be configured for generating a pet profile corresponding to the pet based on the at least one data associated with the pet. Further, the processing device 202 may be configured for analyzing the pet profile based on the machine learning and artificial intelligence. Further, the processing device 202 may be configured for generating the at least one instruction based on the analyzing. Further, the pet profile may include at least one pet habit data. Further, the at least one pet habit data may include sleeping habit data, playing habit data, eating habit data, toilet habit data, etc. Further, the machine learning may be useful in predicting trend based on training data. Further, the training data, in an instance, in an instance may include the pet profile. Further, the machine learning, in an instance, may analyze at least on pet habit data included in the pet profile to generate a prediction.

FIG. 3 is a block diagram of a system for facilitating the management of data associated with the pet, in accordance with some embodiments. Further, the system may include at least one IoT device 206, a communication device 204, a processing device 202, at least one presentation device 308, at least one actuator 306, at least one user device 304 and a storage device 302.

Further, the at least one IoT device 206, the communication device 204, and the processing device 202 may be described above Further, in some embodiments, the system 200 may include at least one actuator 306. Further, the at least one actuator 306 may be configured for actuating at least one mechanism associated with the pet. Further, the at least one actuator 306 may be configured to actuate at least one mechanism. Further, the at least one mechanism may include temperature control mechanism, airflow control mechanism, light control mechanism, etc. Further, the at least one actuator 306 may control the at least one mechanism based on the at least one instruction.

Further, in some embodiment, the system 200 may include at least one presentation device 308. Further, the at least one presentation device 308 may be further configured for presenting the indication of behavior. Further, the at least one presentation device 308 may be associated with the at least one user. Further, the at least one behavior may include, sleeping pattern, eating pattern, playing pattern, toilet pattern, etc. Further, the indication of behavior may include the initiation, duration, and termination of the at least one behavior. Further, the at least one presentation device 308 may include a projector, a media player, a smartphone, a smartwatch, a tablet, a personal computer (PC), a desktop, a laptop, and so on. Further, the at least one user may include a pet owner, a pet care provider, a pet product provider, and so on.

Further, in some embodiment, the system 200 may include at least one user device 304. Further, the at least one user device 304 may include a computing device. Further, the at least one user device 304 may include a computing device such as, but not limited to, a smartphone, a smartwatch, a tablet, a personal computer (PC), a desktop, a laptop, and so on. Further, the at least one user may include a pet owner, a pet care provider, a pet service provider, a vetinarian, a pet product provider, etc.

Further, in some embodiment, the system 200 may include a storage device 302. Further, the storage device 302 may be configured for retrieving the historical data from a database. Further, the historical data may include previously recorded pet profile associated with the pet.

Figure 4:
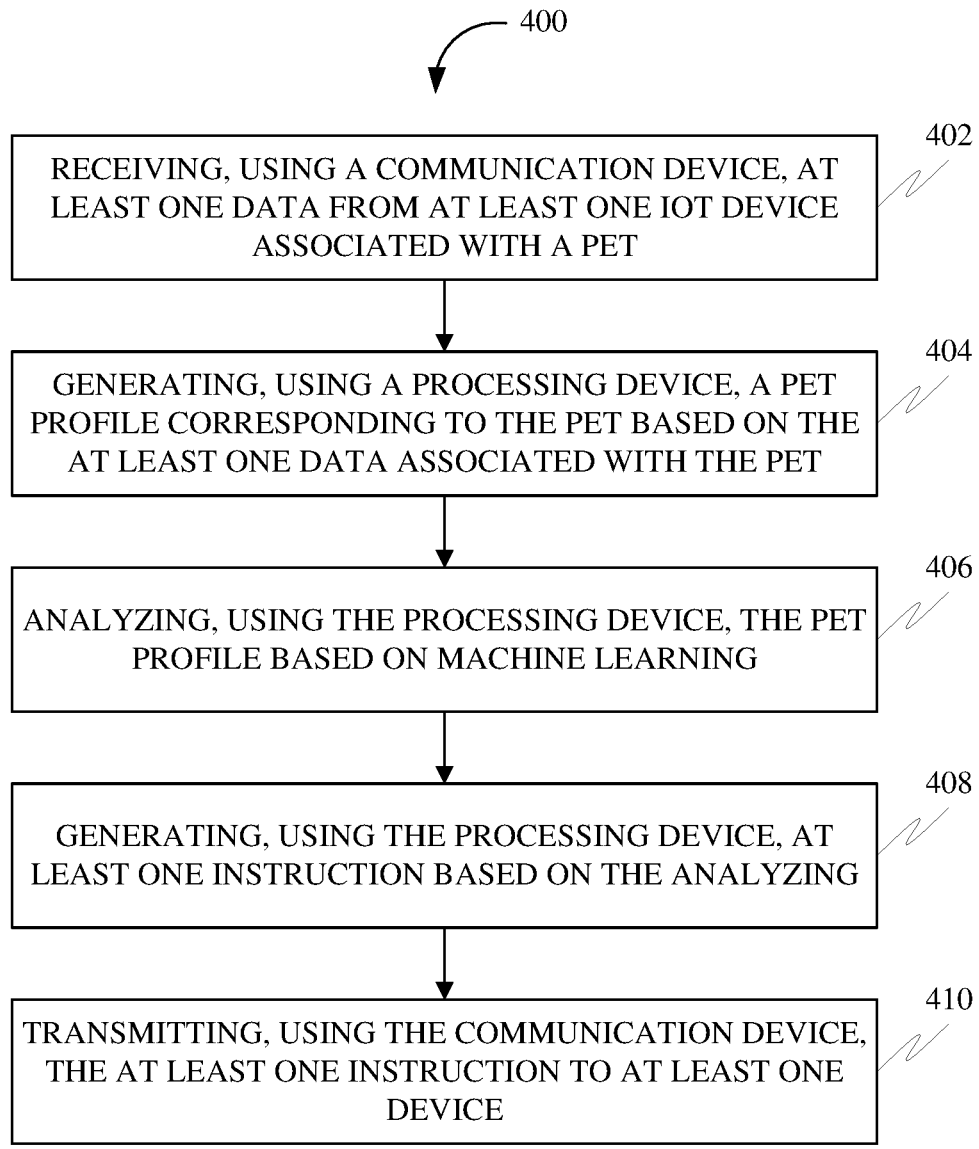
FIG. 4 is a flowchart of a method for facilitating the management of data associated with the pet, in accordance with some embodiments.

FIG. 4 is a flowchart of a method for facilitating the management of data associated with the pet, in accordance with some embodiments. Further, at 402, the method 400 may include receiving, using a communication device, at least one data from at least one IoT device associated with a pet. Further, the at least one data may include any data associated with the pet. Further, the at least one data, in an instance, may include pet environment data and pet body data. Further, the pet environment data may include data related to the surrounding of the pet. Further, the pet environment data, in an instance, may include temperature, relative humidity, etc. Further, the pet body data may include data related to the body of the pet. Further, the pet body data, in an instance, may include pet body temperature, pet bodyweight, etc. Further, the at least one data may be generated by at least one IoT device.

Further, in some embodiments, the at least one data may include a plurality of data corresponding to a plurality of pets. Further, the method may include performing, using the processing device, the machine learning based on the plurality of data. Further, the plurality of data may include the pet profile of the plurality of pets.

Further, in some embodiments, the at least one data may include historical data and current data. Further, the method further may include retrieving, using a storage device, the historical data from a database. Further, the method may include performing, using the processing device, the machine learning based on the historical data. Further, the analyzing of the at least one data may include analyzing the current data. Further, the historical data, in an instance, may include the previous pet profile associated with the pet. Further, the current data, in an instance, may include an instantaneous pet profile associated with the pet.

Further, in some embodiments, the at least one IoT device may include at least one sensor configured to generate at least one sensor data associated with the pet. Further, the at least one sensor, in an instance, may include an image sensor, a sound sensor, a temperature sensor, a humidity sensor, a motion sensor, a weight sensor, blood glucose sensor, heartbeat sensor, etc. Further, the at least one sensor data, in an instance, may include temperature data, humidity data, sunlight exposure data, sound exposure, movement data, weight data, blood glucose data, heartbeat data, etc. Further, the at least one data may include at least one sensor data associated with the at least one sensor.

Further, at 404, the method 400 may include generating, using a processing device, a pet profile corresponding to the pet based on the at least one data associated with the pet. Further, the pet profile may be generated based on the at least one data associated with the pet. Further, the pet profile may include at least one pet habit data. Further, the at least one pet habit data may include sleeping habit data, playing habit data, eating habit data, toilet habit data, etc. Further, the profile data may be used to monitor the activities of the pet.

Further, at 406, the method 400 may include analyzing, using the processing device, the pet profile based on the machine learning. Further, the machine learning may be used to analyze the pet profile. Further, the machine learning may be useful in predicting trend based on training data. Further, the training data, in an instance, in an instance may include the pet profile. Further, the machine learning, in an instance, may analyze at least on pet habit data included in the pet profile to generate a prediction.

Further, at 408, the method 400 may include generating, using the processing device, at least one instruction based on the analyzing. Further, the at least one instruction may be generated based on analyzing the pet profile using the machine learning. Further, the at least one instruction, in an instance, may include a direction, a command, an order, a directive, a demand and/or a requirement to perform at least one operation and/or to describe at least one operation.

Further, in some embodiments, the at least one instruction may include an indication of at least one behavior associated with the pet. Further, the at least one behavior may include, sleeping pattern, eating pattern, playing pattern, toilet pattern, etc. Further, the indication of behavior may include the initiation, duration, and termination of the at least one behavior.

Further, in some embodiments, the at least one instruction may include at least one notification associated with the pet. Further, the at least one device may include at least one user device configured to present the at least one notification.

Further, the at least one notification may include, suggestion, alert, assistance, action, etc. Further, the at least one notification may be in the form of a message. Further, the message may include text message, audio message, video message, etc.

Further, at 410, the method 400 may include transmitting, using the communication device, the at least one instruction to at least one device. Further, the at least one device may include at least one actuator. Further, the at least one instruction may include at least one actuator. Further, the at least one actuator may be actuated using at least one instruction. Further, the at least one device may include at least one user device associated with at least one user. Further, the at least one user device may include presentation device such as, but not limited to, a smartphone, a smartwatch, a tablet, a personal computer (PC), a desktop, a laptop, a voice activated bot and so on. Further, the at least one user may include a pet owner, a pet care provider, a pet service provider, a vetinarian, a pet product provider, etc.

Further, in some embodiments, the at least one device may include at least one actuator configured to actuate at least one mechanism associated with the pet. Further, the actuation of the at least one mechanism may be based on the at least one instruction. Further, the at least one instruction may include a direction to actuate the at least one mechanism of the at least one actuator. Further, the at least one mechanism may include temperature control mechanism, airflow control mechanism, light control mechanism, etc. Further, the at least one actuator may control the at least one mechanism based on the at least one instruction.

Further, in some embodiments, the method 400 may further include receiving of the at least data from the at least one user device associated with at least one user. Further, the at least one data may be received using the at least one user device associated with at least one user. Further, the at least one user device may include computing device. Further, the at least one user device may include a computing device such as, but not limited to, a smartphone, a smartwatch, a tablet, a personal computer (PC), a desktop, a laptop, a voice activated bot and so on. Further, the at least one user may include a pet owner, a pet care provider, a pet product provider, etc.

Further, in some embodiments, the method 400 may further include presenting the indication of behavior on at least one presentation device associated with the at least one user. Further, the at least one presentation device may include a projector, a media player, a smartphone, a smartwatch, a tablet, a personal computer (PC), a desktop, a laptop, a voice activated bot and so on. Further, the at least one user may include a pet owner, a pet care provider, a pet product provider, and so on.

Figure 5:
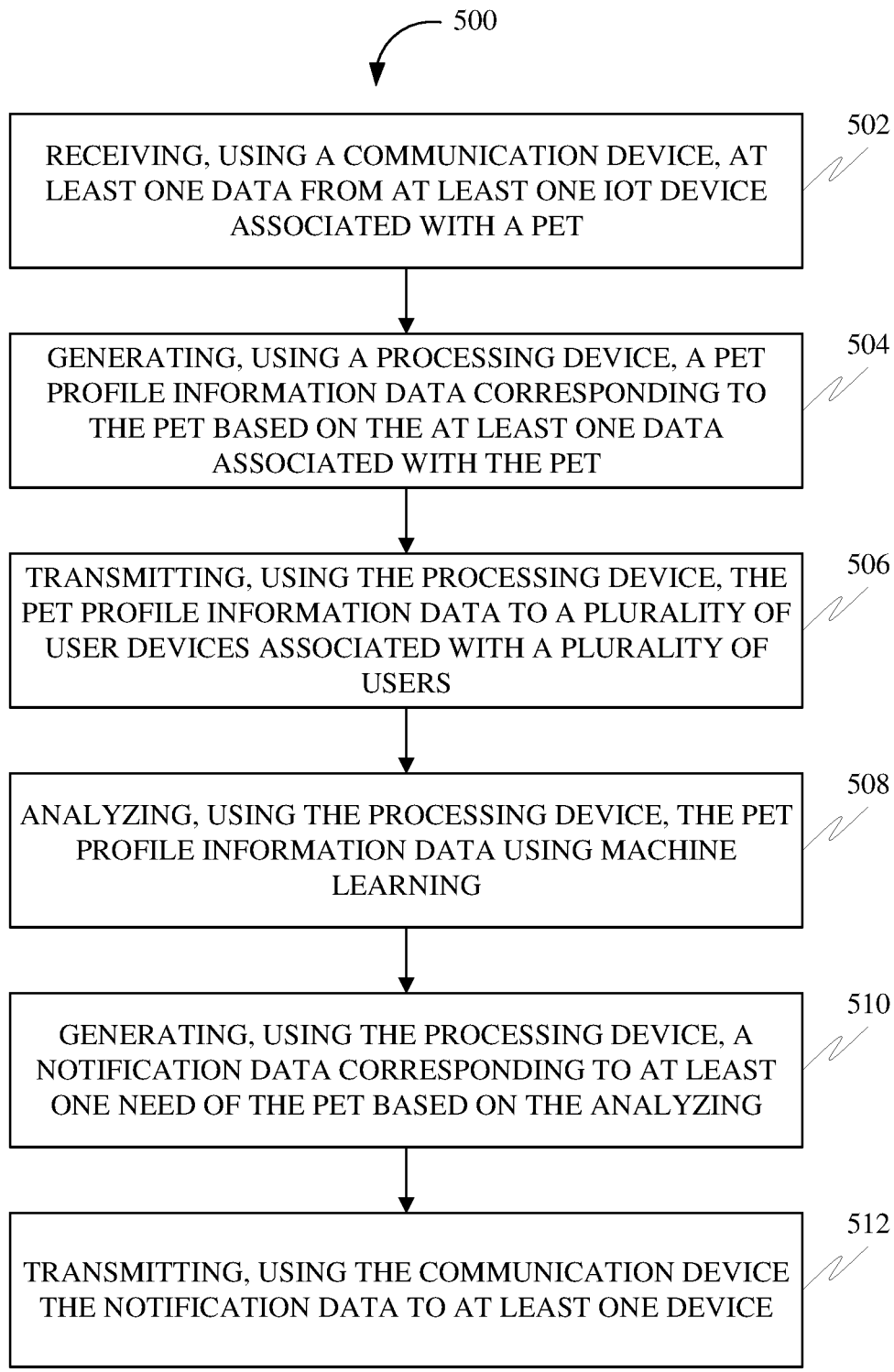
FIG. 5 is a flowchart of a method for facilitating the management of data and notification associated with the pet, in accordance with some embodiments.

FIG. 5 is a flowchart of a method for facilitating the management of data and notification associated with the pet, in accordance with some embodiments. Further, at 502, the method 500 may include receiving, using a communication device, at least one data from at least one IoT device associated with a pet. Further, the at least one data may include any data associated with the pet. Further, the at least one data, in an instance, may include pet environment data and pet body data. Further, the pet environment data may include data related to the surrounding of the pet. Further, the pet environment data, in an instance, may include temperature, location, relative humidity, etc. Further, the pet body data may include data related to the body of the pet. Further, the pet body data, in an instance, may include pet body temperature, pet bodyweight, pet movement, pet heart rate, pet breathing, etc. Further, the at least one data may be generated by at least one IoT device.

Further, at 504, the method 500 may include generating, using a processing device, a pet profile information data corresponding to the pet based on the at least one data associated with the pet. Further, the pet profile information data may be generated based on the at least one data associated with the pet. Further, the pet profile information data may include information about the pet. Further, the information may include, but not limited to, pet size data, pet weight data, pet special need data, pet care activity data, at least one pet habit data, etc. Further, the at least one pet habit data may include, in an instance, may include sleeping habit data, playing habit data, eating habit data, toilet habit data, etc. Further, the profile data may be used to monitor the activities of the pet.

Further, at 506, the method 500 may include transmitting, using the processing device, the pet profile information data to a plurality of user devices associated with a plurality of users. Further, the plurality of user devices, in an instance, may include computing devices such as, but not limited to, smartphones, smartwatches, tablets, personal computers (PC), desktops, laptops, voice activated bots and so on. Further, the plurality of users, in an instance, may include pet owners, pet-care providers, and pet-product providers. Further, the plurality of the users may use the profile information data to monitor the activity of the pet.

Further, at 508, the method 500 may include analyzing, using the processing device, the pet profile information data using the machine learning. Further, the machine learning may be used for predicting a trend based on training data. Further, the training data, in an instance may include the pet profile information data. Further, the machine learning, in an instance may analyze pet size data, pet weight data, special need data, at least one pet habit data, etc. included in the pet profile information data to generate a prediction for at least one need of the pet.

Further, at 510, the method 500 may include generating, using the processing device, a notification data corresponding to at least one need of the pet based on the analyzing. Further, the notification data may include, suggestion, alert, assistance, action, etc. regarding the at least one need of the pet. Further, the notification data may be in the form of a message. Further, the message may include text message, audio message, video message, etc. Further, the at least one need of the pet, in an instance, may include pet products, pet care, and pet interactions. Further, the pet product, in an instance, may include all types of product associated with the pet. Further, the pet product, in an instance, may include pet food, pet bath soap, pet vitamins, pet medicines, etc. Further, pet care may include specialized care such as pet watching, walking, grooming, pet cleaning, training, pet health checkup, etc. Further, the pet interaction may include interactive activities with the pet such as but not limited to, playing with the pet, patting the pet, etc.

Further, at 512, the method 500 may include transmitting, using the communication device the notification data to at least one device. Further, the at least one device may include at least one presentation device associated with at least one user. Further, the at least one presentation device may be used to present the notification data to at least one user. Further, the at least one presentation device may include presentation device such as, but not limited to, a projector, a media player, a smartphone, a smartwatch, a tablet, a personal computer (PC), a desktop, a laptop, a voice activated bot, a gaming console and so on. Further, the at least one user, in an instance, may include a pet owner, a pet care provider, a pet product provider, etc.

Figure 6:
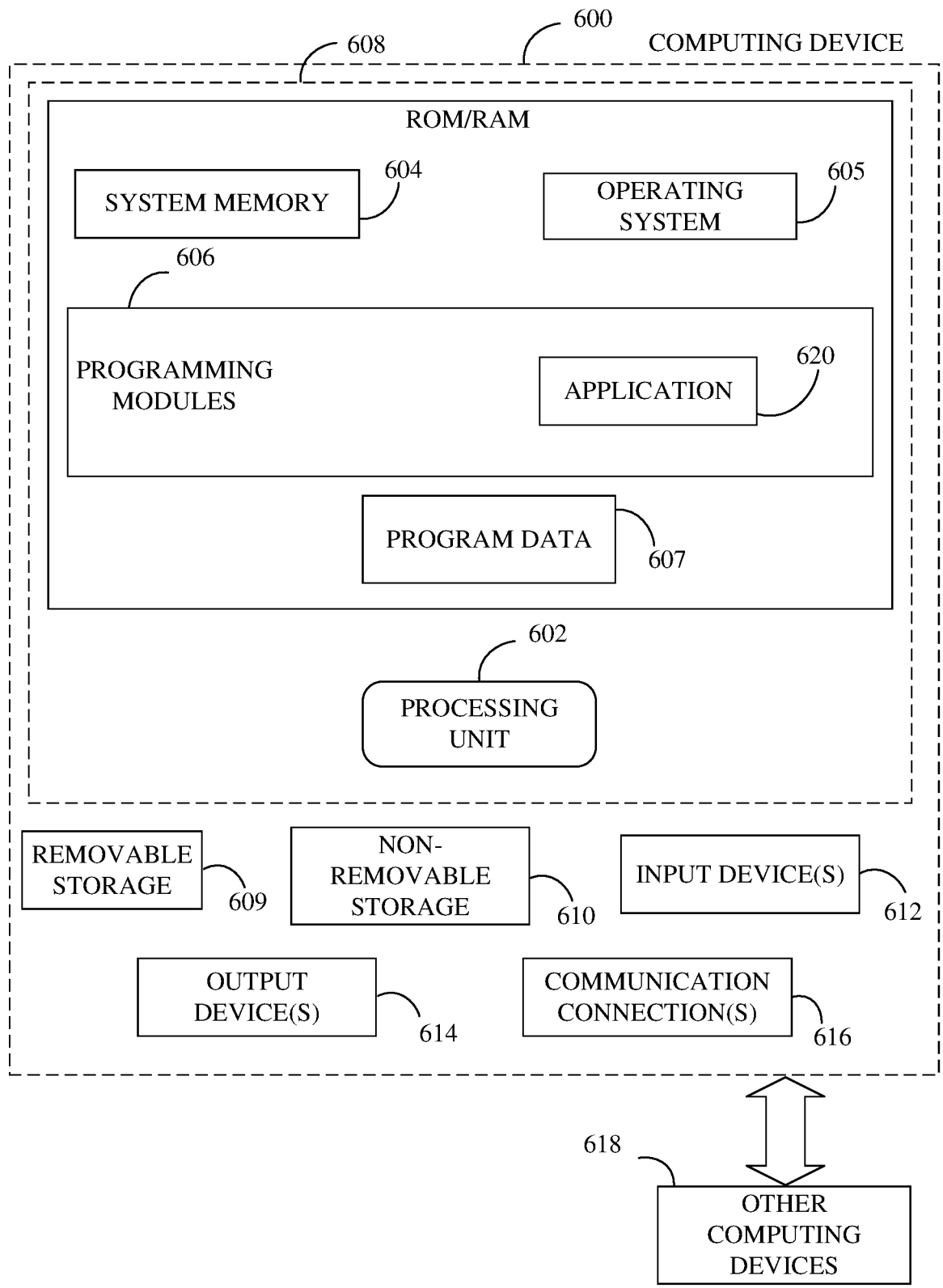
FIG. 6 is a block diagram of a computing device for implementing the methods disclosed herein, in accordance with some embodiments.

With reference to FIG. 6, a system consistent with an embodiment of the disclosure may include a computing device or cloud service, such as computing device 600. In a basic configuration, computing device 600 may include at least one processing unit 602 and a system memory 604. Depending on the configuration and type of computing device, system memory 604 may comprise, but is not limited to, volatile (e.g. random-access memory (RAM)), non-volatile (e.g. read-only memory (ROM)), flash memory, or any combination. System memory 604 may include operating system 605, one or more programming modules 606, and may include a program data 607. Operating system 605, for example, may be suitable for controlling computing device 600's operation. In one embodiment, programming modules 606 may include image-processing module, machine learning module. Furthermore, embodiments of the disclosure may be practiced in conjunction with a graphics library, other operating systems, or any other application program and is not limited to any particular application or system. This basic configuration is illustrated in FIG. 6 by those components within a dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and non-volatile, removable and non-removable media implemented in any method or technology for storage of information, such as computer-readable instructions, data structures, program modules, or other data. System memory 604, removable storage 609, and non-removable storage 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a touch input device, a location sensor, a camera, a biometric sensor, etc. Output device(s) 614 such as a display, speakers, a printer, etc. may also be included. The aforementioned devices are examples and others may be used.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 604, including operating system 605. While executing on processing unit 602, programming modules 606 (e.g., application 620 such as a media player) may perform processes including, for example, one or more stages of methods, algorithms, systems, applications, servers, databases as described above. The aforementioned process is an example, and processing unit 602 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

The invention claimed is:

1. A method for facilitating the management of data associated with a pet, the method comprising: receiving, using a communication device, at least one data from at least one IoT device associated with a pet; generating, using a processing device, a pet profile corresponding to the pet based on the at least one data associated with the pet; analyzing, using the processing device, the pet profile based on machine learning; generating, using the processing device, at least one instruction based on the analyzing; and transmitting, using the communication device, the at least one instruction to at least one device, wherein the at least one data comprises historical data and current data, wherein the method further comprises retrieving, using a storage device, the historical data from a database, wherein the method further comprises performing, using the processing device, the machine learning based on the historical data, wherein the analyzing of the at least one data comprises analyzing the current data.

2. A method of facilitating the management of data associated with a pet, the method comprising:

receiving, using a communication device, at least one data from at least one IoT device associated with a pet;

generating, using a processing device, a pet profile information data corresponding to the pet based on the at least one data associated with the pet;

transmitting, using the processing device, the pet profile information data to a plurality of user devices associated with a plurality of users;

analyzing, using the processing device, the pet profile information data using machine learning;

generating, using the processing device, a notification data corresponding to at least one need of the pet based on the analyzing; and transmitting, using the communication device the notification data to at least one device.

3. A system for facilitating the management of data associated with a pet, the system comprising: at least one IoT device configured for generating at least one data associated with a pet; a communication device configured for: receiving the at least one data from the at least one IoT device; and transmitting at least one instruction to at least one device; and a processing device configured for: generating a pet profile corresponding to the pet based on the at least one data associated with the pet; analyzing the pet profile based on machine learning; and generating the at least one instruction based on the analyzing, wherein the communication device is configured for receiving the at least one data, wherein the at least one data comprises a historical data and a current data, wherein the system further comprises a storage device configured for 16/566,166 retrieving the historical data from a database, wherein the processing device is configured for:

performing the machine learning based on the historical data; and analyzing the current data.

4. The system of claim 3, wherein the communication device is configured for transmitting the at least one instruction to the at least one device, wherein the at least one instruction comprises a purchase instruction, wherein the at least one device comprises an online store server.

5. The method of claim 1, wherein the at least one data comprises a plurality of data corresponding to a plurality of pets, wherein the method further comprises performing, using the processing device, the machine learning based on the plurality of data.

6. The method of claim 1, wherein the at least one IoT device comprises at least one sensor configured to generate at least one sensor data associated with the pet.

7. The method of claim 1, wherein the at least one device comprises at least one actuator configured to actuate at least one mechanism associated with the pet, wherein the actuation of the at least one mechanism is based on the at least one instruction.

8. The method of claim 1, wherein the at least one instruction comprises an indication of at least one behavior associated with the pet.

9. The method of claim 1, wherein the at least one instruction comprises at least one notification associated with the pet, wherein the at least one device comprises at least one user device configured to present the at least one notification.

10. The method of claim 1 further comprises receiving of the at least data from the at least one user device associated with at least one user.

11. The method of claim 1 further comprises presenting the indication of behavior on at least one presentation device associated with the at least one user.

12. The system of claim 3, wherein the communication device is configured for receiving the at least one data, wherein the at least one data comprises a plurality of data corresponding to a plurality of pets; wherein the processing device is configured for performing the machine learning based on the plurality of data.

13. The system of claim 3, wherein the at least one IoT device comprises at least one sensor, wherein the at least one sensor is associated with the pet.

14. The system of claim 3, wherein the at least one device comprises at least one actuator, wherein the at least one actuator is configured for actuating at least one mechanism associated with the pet.

15. The system of claim 3, wherein the communication device is configured for transmitting at least one instruction, wherein the at least one instruction comprises an indication of at least one behavior associated with the pet.

16. The system of claim 3, wherein the communication device is configured for transmitting the at least one instruction, wherein the at least one instruction comprises at least one notification, wherein the at least one device comprises at least one user device, wherein the at least one user device is configured to present the at least one notification.

\* \* \* \* \*